(No Model.) 3 Sheets—Sheet 2.
E. U. KINSEY.
ROTARY CUTTER HEAD.
No. 536,432. Patented Mar. 26, 1895.
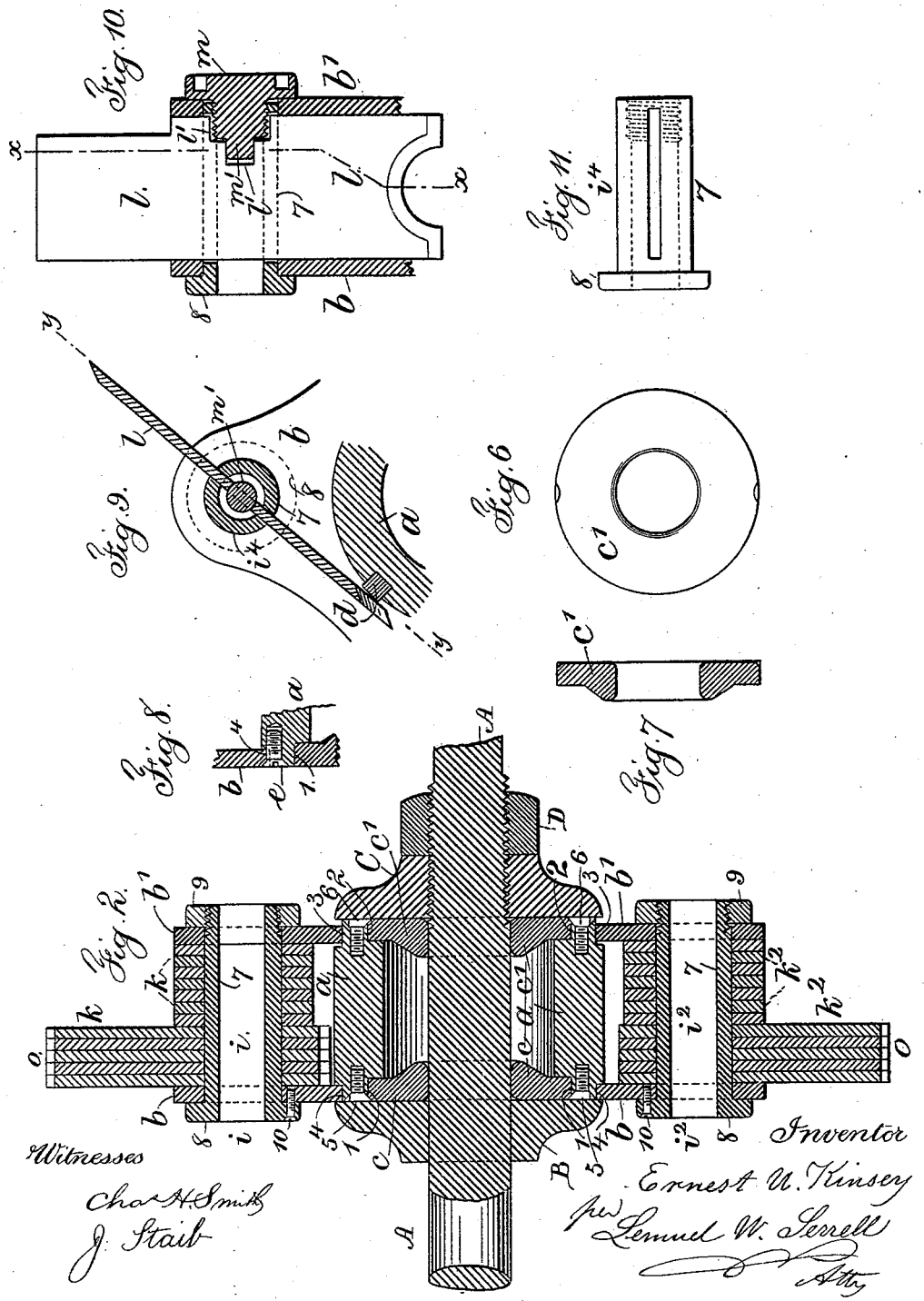
Witnesses
Chas. H. Smith
J. Staib
Inventor
Ernest U. Kinsey
per Lemuel W. Serrell
Atty (No Model.) 3 Sheets—Sheet 3.

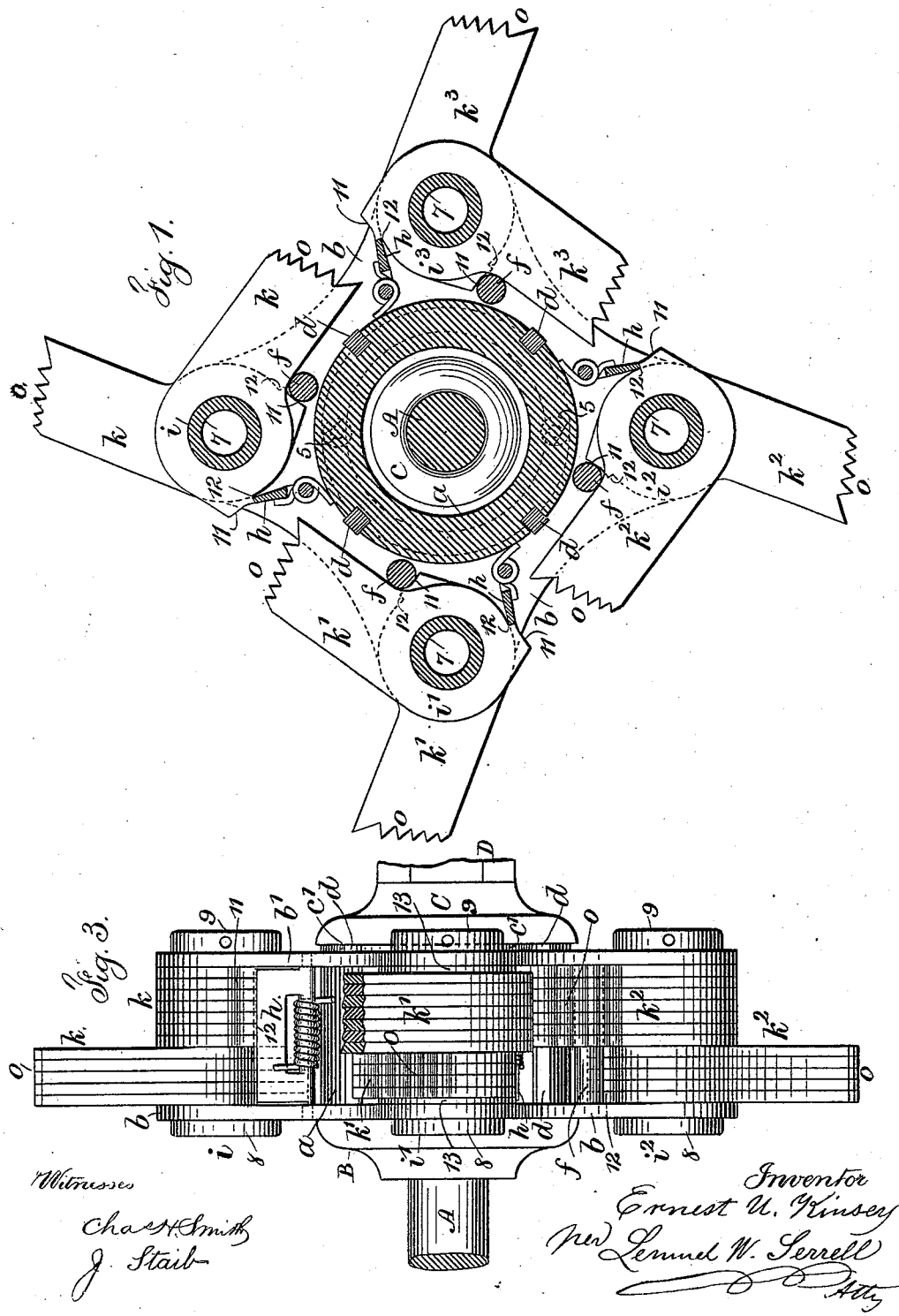

E. U. KINSEY.
ROTARY CUTTER HEAD.

No. 536,432. Patented Mar. 26, 1895.

Witnesses
Chas H Smith
J. Staib

Inventor
Ernest U. Kinsey
per Lemuel W. Serrell
Atty

UNITED STATES PATENT OFFICE.

ERNEST U. KINSEY, OF NEW YORK, N. Y., ASSIGNOR TO EDWARD J. IRWIN, OF SAME PLACE.

ROTARY CUTTER-HEAD.

SPECIFICATION forming part of Letters Patent No. 536,432, dated March 26, 1895.

Application filed April 13, 1894. Serial No. 507,398. (No model.)

*To all whom it may concern:*

Be it known that I, ERNEST U. KINSEY, a citizen of the United States, residing in the city, county, and State of New York, have invented a new and useful Improvement in Rotary Cutter-Heads, of which the following is a specification.

My invention relates to wood working machinery and particularly to such rotary cutter heads as are employed for forming moldings, dados, tongues and grooves and kindred forms in working wood for use in the arts and manufactures.

In carrying out my invention I employ a hub and side plates connected therewith and together and interchangeable bolts preferably tubular and adapted to carry and support the cutters. The hub is provided with interchangeable collars having central openings adapted to receive mandrels or arbors of different sizes. The cutters consist of thin blades with cutting edges and any desired number according to the work to be performed may be projecting for use or be turned inwardly out of the way, and I provide stops for holding and regulating the positions of the cutters when in use and adjustable means for holding the cutters when turned inwardly and also means for holding and determining the position of the cutting blades in and to the tubular bolts. The cutting blades are placed at points equidistant from each other or at points opposite to the center of the hub and side plates, and cutting blades in sets of two, four, six or more may be employed according to the size of the rotary cutter head, the same thereby being perfectly balanced so that there is no undue strain in working at the high speed required.

Figure 4:
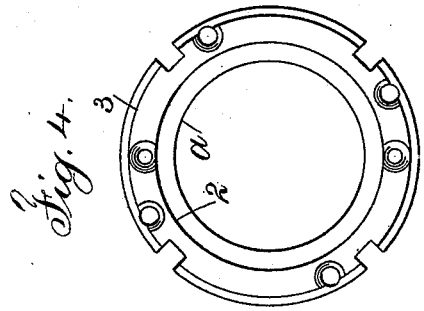
Figure 5:
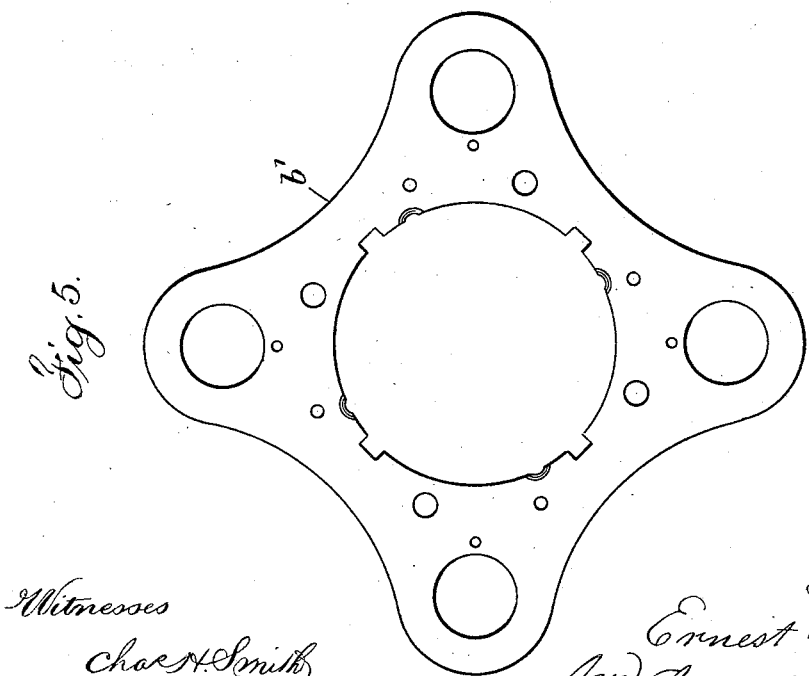

In the drawings, Figure 1 is a vertical longitudinal section of my improved cutter head with the cutters in elevation. Fig. 2 is a vertical cross section of the same. Fig. 3 is an edge elevation. Fig. 4 is a side elevation of the hub. Fig. 5 is a side elevation of one side plate. Fig. 6 is a face view and Fig. 7 a cross section of one of the center collars. Fig. 8 is a detached cross section showing the screws for securing one side plate to the hub. Fig. 9 is a detached partial longitudinal section at the line $x\ x$ of Fig. 10, showing a cutting blade in position. Fig. 10 is a cross section of the parts shown in Fig. 9 at the line $y\ y$ with the cutting blade in elevation, and Fig. 11 is a plan of the tubular bolt shown in Figs. 9 and 10 without the nut $m$.

The arbor or mandrel A is provided with a collar B keyed on, and with a screw collar C and lock nut D. These parts are of usual and well known construction and adapted to carry cutter heads, saws or similar devices for working up wood, and suitable power is communicated to said arbor to rotate the same and the devices carried thereby.

The hub $a$ is a short hollow cylinder provided with inner and outer edge shoulders 1, 2, 3, 4. In the opposite faces of the hub $a$ are holes for the screws 5 6, and in one side are holes for the screws $e$, and across the periphery of the hub are transverse grooves for the keys $d$. The outer edge shoulder 3 is wider than the shoulder 4, the shoulder 4 being of a width equal to the thickness of one of the side plates.

The metal side plates $b\ b'$ have central openings to fit onto the edge shoulders 3 4 of the hub. There are notches to fit over the keys $d$ and notches in the plate $b$ for the heads of the screws $e$ employed to secure the plate $b$ to the hub $a$. The edge shoulder 4 in width agrees with the thickness of the plate $b$, but the edge shoulder 3 is wider than the thickness of the plate $b'$ to provide for the movement of the plate in tightening and loosening and setting the cutters independent of the collars of the mandrel or arbor. The side plates $b\ b'$ have openings for other parts hereinafter set forth.

The collars $c\ c'$ fit into the hub $a$ within the edge shoulders 1 2, so that their faces are flush with the faces of the hub, and said collars are notched and are held in place and kept from turning by the screws 5 6. The arbor or mandrel A passes through these collars and the faces of the fast and loose collars B C come up against the faces of the collars $c\ c'$ and hub $a$. Other similar collars with larger or smaller center openings are interchangeable with the collars $c\ c'$ to accommodate arbors A of different sizes.

Bolts $i\ i'\ i^2$ and $i^3$ that preferably are tubular pass through openings in the side plates $b\ b'$ and extend across between said side plates. Each bolt is exteriorly threaded at one end for the nut 9 and has a stem 7 and head 8, and I prefer to employ one or more screws 10 passing through the head 8 into the side plate $b$ to prevent the said bolts turning in the plates. These bolts bind or clamp the cutters between the side plates and also secure the plates in place.

Pins $f$ pass through and screw tight into the plate $b$ and their ends pass into holes through the plate $b'$ and these pins assist in maintaining the side plates in alignment with each other and serve as hereinafter set forth as stops for the cutter blades, the keys $d$ serving the purpose of maintaining a fixed relation between the hub $a$ and plates $b\ b'$ to prevent the hub turning in the plates in use.

The sets of cutters $k\ k'\ k^2\ k^3$ are narrow blades with serrated cutting teeth $o$, and said blades have openings through which pass the bolts $i\ i'\ i^2\ i^3$, and each of said cutters has a projection 11 and a notch 12. The projections 11 come against the screw pins $f$ which act as stops for the cutters when projecting and in position for cutting. The spring latch plates $h$ have lugs as pivots bearing in holes in the side plates $b\ b'$, and said latch plates are held by their springs against the cutters and engage the notches 12 when the cutters are turned inwardly, in which position the cutters also bear against the screw pins $f$.

Upon the opposite bolts $i\ i^2$ are shown twelve cutters in sets $k\ k^2$, and upon the other and opposite bolts $i'\ i^3$ are shown eleven cutters in sets $k'\ k^3$ with washers 13 between the outer cutters and the side plates $b\ b'$. See Fig. 3. This places the sets of cutters $k\ k^2$ intermediate or staggered with the sets of cutters $k'\ k^3$, thus making provision for widths of cutting increased or decreased by half the thickness of the saws. In full size these cutters are to be one-eighth of an inch in thickness, and if all the cutters in the sets be turned inwardly but the first cutters of the sets $k$ and $k^2$, the cut made will be one-eighth of an inch in width. If the first cutters of the sets $k'$ and $k^3$ be now turned up in addition to those before named, the cut will now be three-sixteenths of an inch in width. Now if the second cutters of the sets $k$ and $k^2$ be turned up in addition to those before named, the cut made by the combined cutters will be one-fourth of an inch in width. The cut made by the cutters can be thus increased or decreased by sixteenths of an inch all the way between one-eighth of an inch and one and one-half inches as desired, according to the work to be performed. This arrangment of narrow cutter blades also permits the use of the cutter blades in several groups in making several aligned grooves or the use of the cutter blades upon opposite sides in making a head or tongue or the use of the blades at the central portion in making a groove, or in any other desired arrangement.

The cutter blades are readily turned outwardly or inwardly and they are stopped in either position by the screw pins $f$ and are held when turned inwardly by the spring latch plates $h$. These spring latch plates are readily moved outwardly against the action of their springs when it is necessary to project the cutters for use.

The devices hereinbefore described are adapted for use with fixed flat cutters as well as pivoted cutters, no other change being necessary save the removal of the spring latch plates $h$ from between the side plates $b\ b'$ and the substitution for the bolts of tubular bolts of modified form as hereinafter described.

The tubular bolt $i^4$ is mortised through opposite sides for the reception of the cutting blade $l$, the mortises being slightly longer than the width of the blade and the end of this tubular bolt opposite to the head 8 is internally threaded to receive the screw nut $m$. This nut $m$ has a reduced end $m'$ and a head by which it is rotated, and the cutting blade $l$ has a compound notch $l'$ in one edge at about the center whose outer portion is slightly larger than the screw threaded portion of the nut to receive the same freely and whose inner portion receives the reduced end $m'$ of the said nut.

All the blades $l$ that are employed are made alike and are both held securely and centered by the nut $m$ fitting into the notch at $l'$ in one edge of the blade, so that their cutting edges describe the same circular path. The end of the cutter $l$ nearest the hub $a$ is supported by bearing upon one of the keys $d$, as shown in Fig. 9.

In my improvement the parts are so arranged as to combine a minimum of weight and a maximum of strength together with rigidity and adjustability, and the possibility of using in the one device several forms of cutters increases the efficiency of the mechanism.

I claim as my invention—

1. In a rotary cutter head, the combination with the arbor and its fast and movable collars, of the hub $a$ having inner and outer edge shoulders, the removable collars $c\ c'$ received within the hub and whose faces are flush with the hub faces and against which the collars of the arbor bear, side plates $b\ b'$ received upon the outer edge shoulders of the hub, one of said plates being adjustable, and means for holding said plates together and to the hub, substantially as and for the purposes set forth.

2. In a rotary cutter head, the combination with the arbor and its fast and movable collars, of the hub $a$ and the plate $b$ connected thereto, the plate $b'$ fitting over and movable along upon the hub, groups of cutters in independent sets between said plates, bolts passing through said plates and cutters and upon which the said cutters are pivoted so as to be adapted to be turned out for action or inwardly out of action, the said bolts clamping the sets of cutters in place between the plates, substantially as specified.

3. In a rotary cutter head, the combination with a hub and side plates connected therewith, of bolts passing through and clamping said plates at points equidistant from each other and also equidistant from the axial center of the hub, and cutters pivotally connected to and supported by said bolts and adapted to be turned out for action or turned inwardly out of action, substantially as set forth.

4. In a rotary cutter head, the combination of the hub $a$, the side plates $b\ b'$, the bolts passing through and across between said plates, the cutters $k$ in sets or groups through which said bolts pass and on which they may be projected or turned inwardly, stops against which said cutters come in either of said positions, and spring latch plates for engaging the cutters when turned inwardly to prevent them flying out by centrifugal force, substantially as set forth.

5. In a rotary cutter head, the combination of the hub, the side plates, the equidistant bolts passing through and across between said plates, cutter blades in sets between the plates upon two opposite bolts, other cutter blades in sets upon the other opposite bolts, with washers of half the thickness of the blades between the plates and cutter blades so that the cutters upon two opposite bolts are intermediate or staggered with the cutters upon the other two opposite bolts, said cutter blades being adapted to be turned down in any desired number and clamped by the bolts, whereby the cuts made can be increased or decreased in width by half the thickness of a cutter blade, substantially as specified.

6. In a rotary cutter head, the combination of the hub $a$, the side plates $b\ b'$, the bolts passing through and across between said plates at points opposite to the axial center of the hub, the cutters in sets upon said bolts and adapted to be turned inwardly in any desired number when not in use according to the cut to be made, substantially as set forth.

7. In a rotary cutter head, the combination of the hub $a$, the side plates $b\ b'$, means for securing said plates to and maintaining their relation with said hub, the tubular bolts passing through and across between said plates and having mortises, the cutters passing through the said bolts and means for holding said blades in a determined position, substantially as set forth.

8. In a rotary cutter head, the combination of the hub $a$, the side plates $b\ b'$, means for securing said plates to and maintaining their relation with said hub, the tubular bolts passing through and across between said plates and having mortises, the cutters passing through said bolts and having notches in one edge, and the screws having reduced ends and adapted to screw into the ends of said tubular bolts to secure the cutters in a determined position, substantially as set forth.

9. In a rotary cutter head, the combination of the hub $a$ having inner and outer edge shoulders, the collars $c\ c'$ received in the hub, the keys $d$ extending transversely across the face of the hub, the side plates $b\ b'$ fitting over upon the outer shoulders of the hubs and over the said keys, the screw pins $f$ extending across between the side plates, the bolts passing through and across between the side plates, whose heads bear against the outer face of one plate and whose clamping nuts bear against the outer face of the other side plate in holding the plates together and clamping the cutters carried by said bolts, substantially as set forth.

Signed by me this 26th day of March, A. D. 1894.

E. U. KINSEY.

Witnesses:
GEO. T. PINCKNEY,
HAROLD SERRELL.